Dec. 10, 1957 L. SEDLMAYR 2,815,935

DISK DIGGER

Filed Dec. 19, 1955

2,815,935
Patented Dec. 10, 1957

2,815,935

DISK DIGGER

Lorenz Sedlmayr, Oberzeitlbach uber Aichach, Germany, assignor of one-half to Paul O. Tobeler, doing business under the name of Trans-Oceanic, Los Angeles, Calif.

Application December 19, 1955, Serial No. 554,063

6 Claims. (Cl. 255—74)

This invention relates to a drilling device which is equipped with disks and which is particularly useful for digging holes such as deep wells.

While the usual type of drill which is provided with a single disk is useful, its effect is small, because each lifting operation removes only a small quantity of earth from the hole. For drilling holes of different diameters the operator must have a complete set of drills. Since such diggers operate only one disk or one cutter, the drilling device must be lifted whenever the disk becomes full and the quantity of earth lifted by this operation is very small.

The raising of the drill also requires disconnecting the drill axle, after which a new connecting operation is required. Pre-drilling by a small drilling device and the enlarging of the hole by a larger device is time-wasting, two operations being necessary, and such a procedure is extremely hard in difficult soils such as wet clay.

This invention eliminates all of the foregoing disadvantages. The invention provides the axle of the drilling device with a plurality of disks, which are supported thereon concentrically and filled simultaneously. The disks are lifted by one operation. The disks are approxiately and adjustably spaced along the shaft and have successively larger diameters, beginning from the bottom. With this construction the disks separate the earth by steps on the periphery of the hole.

This construction is highly effective, because all of the disks are filled before the lifting operation, so that many times more earth is lifted than in the usual manner. The separating operation is also easier, each disk separating only one step, with the separated earth settling on the disk therebeneath. One or more pair of claws may also be provided above the top disk.

My invention considerably lowers the cost of deep well drilling. Other advantages, objects and features of my invention will appear from a careful perusal of the accompanying drawings and detailed description.

While I have shown in the accompanying drawings preferred embodiments of my invention, it should be understood that the same are susceptible of modification and change without departing from the spirit of my invention.

Referring to the drawings.

Figure 1:
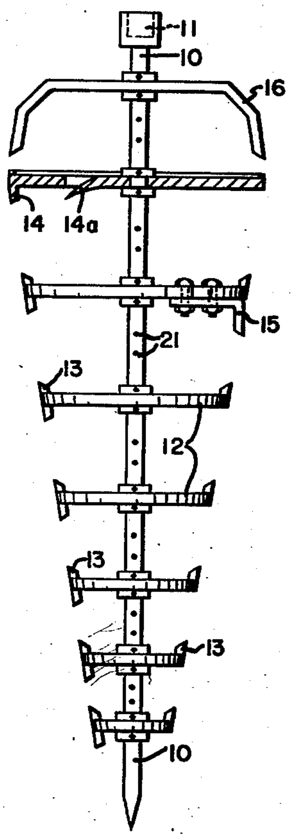
Fig. 1 is a side elevational view of a preferred embodiment of the invention with the top disk shown in section.

A preferred embodiment which has been selected to illustrate my invention comprises an elongated shaft 10 having a coupling member 11 adjacent the upper end thereof for attachment of the shaft 10 to a suitable source of rotation. The shaft 10 is preferably square in cross section and its lower end is pointed for easy insertion into the ground.

Mounted at spaced intervals along the shaft 10 are a plurality of circular disks 12, each of which is provided around its periphery with an upwardly directed flange 13 for holding dirt thereon. Each of the disks 12 is provided with a downwardly directed cutting blade 14 and/or 14a or with a separate cutting member 15, which is removably attached to the disk 12. Each of the disks 12 is held on the shaft 10 by suitable fastening means such as one or more bolts which extend through openings in collars surrounding the shaft 10. The openings in the collars are aligned with openings 21 which extend through the shaft 10. The shaft 10 is provided with spaced openings 21, which extend along its entire length to permit adjustment of the disks to any desired positions therealong.

The disk adjacent the bottom of the shaft 10 is smallest in diameter and the diameters of the disks disposed thereabove are gradually increased, each disk being several inches larger in diameter than the disk therebeneath. As the shaft 10 is rotated, the cutting blades 14 or cutting members 14a of all of the disks 12 simultaneously cut the earth loose around the periphery of the hole, the loose dirt falling onto the disk therebeneath. A substantially U-shaped blade 16 is mounted in inverted position above the top disk 12 to deposit earth upon it.

Figure 2:
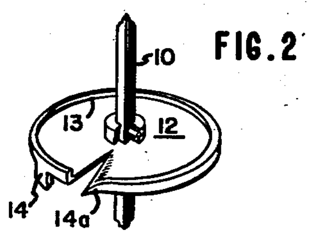
Fig. 2 is a top perspective view of the top disk.

Referring to Fig. 2 of the drawings, this shows how my device cuts the earth in steps corresponding to the sizes of the disks. This figure also shows a piece of pipe 17, the end of which is mounted in the upper part of the hole. A pair of self-spreading claws 18 is suitably mounted on the upper end of the shaft 10. The claws include a pair of cutters 19, the outer ends of which are provided with downwardly directed cutting blades. The cutters 19 are pivotally mounted, with a pair of leaf springs 20 exerting pressure tending to hold them in an outspread position. Upon upward movement of the shaft 10, the cutters 19 are pivoted inwardly by contact with the pipe 17 to permit removal of the shaft from the ground.

Figure 3:
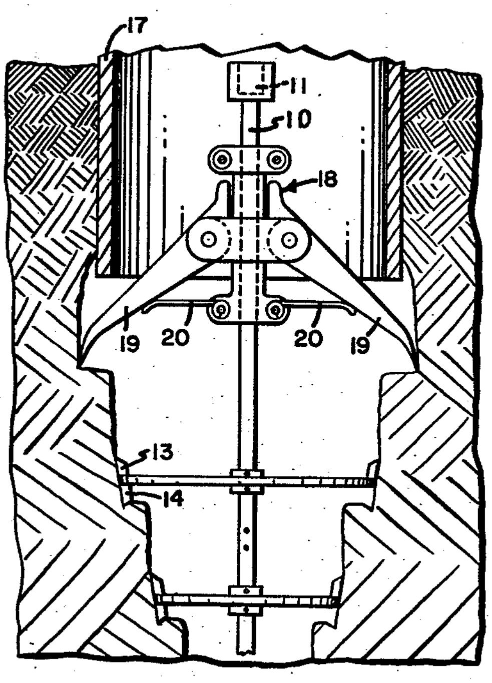
Fig. 3 is a side elevational view of another embodiment of my invention in use.
Figure 4:
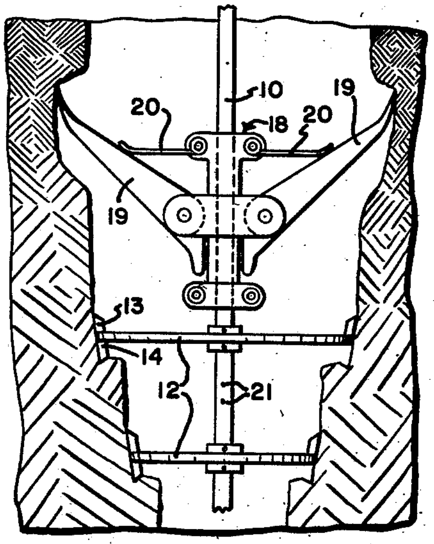
Fig. 4 is a view similar to Fig. 3, with the claws in use in inverted position.

Referring to Fig. 3 of the drawings, this shows the same pair of claws 18 in inverted postion for use of the device as an enlarging tool. This device is operated by lifting the shaft 10 at the same time that it is rotated.

I claim:

1. A digging device comprising an elongated shaft, a plurality of substantially circular disks mounted at spaced intervals on said shaft, each of said disks being flat and extending substantially transversely to said shaft, each of said disks carrying a downwardly directed cutting blade, the diameters of said disk successively increasing from the bottom of said shaft to the top thereof.

2. The subject matter of claim 1, and means for adjusting the positioning of said disks along said shaft, said disks adapted to be removed from said shaft and replaced.

3. The subject matter of claim 1, and a cutting blade mounted above the uppermost of said disks, said cutting blade adapted to cut earth to fill said uppermost disk.

4. The subject matter of claim 1, and a pair of self-spreading claws mounted above the uppermost of said disks, said claws having cutting portions spread by spring action.

5. The subject matter of claim 4, said claws being inverted so that said cutting portions operate to enlarge the hole upon upward rotational movement of said shaft.

6. A disk borer for the boring of deep holes comprising an elongated shaft, a plurality of substantially circular disks mounted at spaced intervals along said shaft, each of said disks being substantially flat and extending substantially transversely to said shaft, each of said disks having an upwardly directed peripheral rim, each of said disks carrying a downwardly directed peripheral rim, each of said disks carrying a downwardly directed cutting blade, the diameters of said disks successively increasing from the bottom of said shaft to the top thereof, each of said cutting blades being adapted to cut earth so that the earth falls on the cutting disk therebelow, each of said disks being adapted to hold cut earth on its upper surface within said rim upon the upward movement of said shaft to facilitate the removal of cut earth from said hole.

References Cited in the file of this patent

UNITED STATES PATENTS

| | | |
|---|---|---|
| 88,891 | McMahen | Apr. 13, 1869 |
| 187,705 | Collins | Feb. 27, 1877 |
| 415,610 | Brown | Nov. 19, 1889 |